US011936012B2

(12) United States Patent
Tsutsui et al.

(10) Patent No.: US 11,936,012 B2
(45) Date of Patent: Mar. 19, 2024

(54) ABNORMALITY DETECTION DEVICE AND ABNORMALITY DETECTION METHOD FOR BATTERY PACK

(71) Applicant: HONDA MOTOR CO., LTD., Tokyo (JP)

(72) Inventors: Jun Tsutsui, Saitama (JP); Fumikazu Maruyama, Saitama (JP); Hiroki Itaya, Saitama (JP); Itsuki Shimazaki, Saitama (JP); Daiki Yanagiuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 387 days.

(21) Appl. No.: 17/198,708

(22) Filed: Mar. 11, 2021

(65) Prior Publication Data

US 2021/0288356 A1 Sep. 16, 2021

(30) Foreign Application Priority Data

Mar. 12, 2020 (JP) .................................. 2020-043117

(51) Int. Cl.
*H01M 10/44* (2006.01)
*H01M 10/42* (2006.01)
(Continued)

(52) U.S. Cl.
CPC ....... *H01M 10/443* (2013.01); *H01M 10/425* (2013.01); *H01M 10/445* (2013.01);
(Continued)

(58) Field of Classification Search
CPC ............ H01M 10/443; H01M 10/425; H01M 10/445; H01M 10/486; H01M 50/569; H01M 2010/4271; H01M 2220/20
(Continued)

(56) References Cited

U.S. PATENT DOCUMENTS

2012/0212183 A1 8/2012 Yamada et al.
2021/0126314 A1 4/2021 Masuda et al.
2021/0226268 A1* 7/2021 Egashira ............. H01M 50/271

FOREIGN PATENT DOCUMENTS

CN     103594743 A    2/2014
DE     112018001368 T5  11/2019
(Continued)

OTHER PUBLICATIONS

Machine Translation of JP2002008631, 10 pages (Year: 2002).*
(Continued)

*Primary Examiner* — Nathaniel R Pelton
(74) *Attorney, Agent, or Firm* — Paratus Law Group, PLLC (57) ABSTRACT

An abnormality detection device includes: a voltage value acquisition unit configured to acquire a voltage value of each battery cells, a state value measurement unit configured to measure a state value inside a battery pack, which is different from a temperature of each battery cell, and an abnormality determination unit configured to determine an abnormality of the battery pack. The abnormality determination unit includes: a voltage value comparison unit configured to compare the voltage value with a predetermined voltage threshold value, and a state value comparison unit configured to compare at least one of the state value and a degree of change in the state value per unit time with a predetermined state threshold value. The abnormality determination unit is configured to determine an abnormality of the battery pack based on both a voltage value comparison result and a state value comparison result.

12 Claims, 8 Drawing Sheets

(51) Int. Cl.
*H01M 10/48* (2006.01)
*H01M 50/569* (2021.01)

(52) U.S. Cl.
CPC ....... *H01M 10/486* (2013.01); *H01M 50/569* (2021.01); *H01M 2010/4271* (2013.01); *H01M 2220/20* (2013.01)

(58) Field of Classification Search
USPC .......................................................... 320/150
See application file for complete search history.

(56) References Cited

FOREIGN PATENT DOCUMENTS

| | | | |
|---|---|---|---|
| DE | 102018209877 A1 | | 12/2019 |
| JP | 2002-008631 | * | 1/2002 |
| JP | 2002-008631 A | | 1/2002 |
| JP | 2011-041386 A | | 2/2011 |
| JP | 2013-541309 A | | 11/2013 |
| JP | 2018-156932 A | | 10/2018 |
| JP | 2018-165659 A | | 10/2018 |
| WO | WO 2020/003802 A1 | | 1/2020 |

OTHER PUBLICATIONS

Jun. 28, 2022, Japanese Office Action issued for related JP Application No. 2020-043117.
Jan. 11, 2022, Japanese Office Action issued for related JP Application No. 2020-043117.
Jan. 31, 2022, German Office Action issued for related DE Application No. 102021105865.1.
Jan. 31, 2022, German Search Report issued for related DE Application No. 102021105865.1.
Oct. 13, 2023, Translation of Chinese Office Action issued for related CN Application No. 202110266489.7.

* cited by examiner

ABNORMALITY DETECTION DEVICE AND ABNORMALITY DETECTION METHOD FOR BATTERY PACK

CROSS REFERENCE TO RELATED APPLICATIONS

This application claims priority to Japanese Patent Application No. 2020-043117 filed on Mar. 12, 2020, the content of which is incorporated herein by reference.

TECHNICAL FIELD

The present invention relates to an abnormality detection device and an abnormality detection method for a battery pack mounted on an electric vehicle.

BACKGROUND ART

In the related art, there has been known an electric vehicle using a motor as a drive source. In the electric vehicle using this type of motor as the drive source, a plurality of battery modules each configured by stacking a plurality of battery cells are arranged inside a battery case, and electric power is supplied to the motor.

In a battery pack mounted on an electric vehicle, when thermal runaway occurs in a battery cell due to a short circuit or the like caused by use outside an assumed range or the like, the battery cell generates heat, and high-temperature gas is ejected from a cell safety valve provided in the battery cell. In the related art, at least one temperature sensor is provided in a battery module (for example, JP 2018-156932 A).

However, the number of temperature sensors is less than the number of battery cells with respect to a battery module that is a set of a plurality of battery cells. Therefore, in a case where the temperature sensor is attached at a position away from the battery cell that has become hot due to thermal runaway, an event of the thermal runaway cannot be accurately detected. In addition, when the temperature sensors are attached to all the battery cells, manufacturing cost is increased.

On the other hand, the battery module is provided with a voltage sensor for detecting a voltage of each battery cell. Therefore, it is possible to determine abnormality of a specific battery cell from the voltage of each battery cell. However, when presence or absence of thermal runaway is determined only from the voltage of each battery cell, a failure of the battery cell and a failure of the voltage sensor, which are not caused by thermal runaway, may occur, and therefore it is insufficient to make a determination using only the voltage from a viewpoint of detection accuracy of thermal runaway.

An aspect of the present invention provides an abnormality detection device and an abnormality detection method for a battery pack capable of improving detection accuracy of thermal runaway while suppressing an increase in manufacturing cost.

SUMMARY OF INVENTION

An abnormality detection device for a battery pack according to an aspect of the present invention detects an abnormality of a battery pack accommodating a plurality of battery cells. The abnormality detection device includes: a voltage value acquisition unit configured to acquire a voltage value of each of the plurality of battery cells, at least one state value measurement unit configured to measure a state value inside the battery pack, the state value being different from a temperature of at least one battery cell among the plurality of battery cells, and an abnormality determination unit configured to determine an abnormality of the battery pack. The abnormality determination unit includes: a voltage value comparison unit configured to compare the voltage value acquired by the voltage value acquisition unit with a predetermined voltage threshold value, and a state value comparison unit configured to compare at least one of the state value acquired by the at least one state value measurement unit and a degree of change in the state value per unit time with a predetermined state threshold value. The abnormality determination unit is configured to determine an abnormality of the battery pack based on both a comparison result by the voltage value comparison unit and a comparison result by the state value comparison unit.

An abnormality detection method for a battery pack according to another aspect of the present invention detects an abnormality of a battery pack accommodating a plurality of battery cells. The abnormality detection method includes: acquiring a voltage value of each of the plurality of battery cells by a voltage value acquisition unit, acquiring a state value inside the battery pack by a state value measurement unit configured to measure a state value inside the battery pack, the state value being different from a temperature of at least one battery cell among the plurality of battery cells, performing a voltage value comparison comparing the voltage value with a voltage threshold value, performing a state value comparison comparing at least one of the state value and a degree of change in the state value per unit time with a predetermined state threshold value, and determining an abnormality of the battery pack based on both a comparison result of the voltage value comparison and a comparison result of the state value comparison.

DESCRIPTION OF EMBODIMENTS

First Embodiment

Hereinafter, embodiments of the present invention will be described with reference to FIGS. 1 to 8. First, a first embodiment of the present invention will be described with reference to FIGS. 1 to 5.

[Battery Pack]

Figure 1:
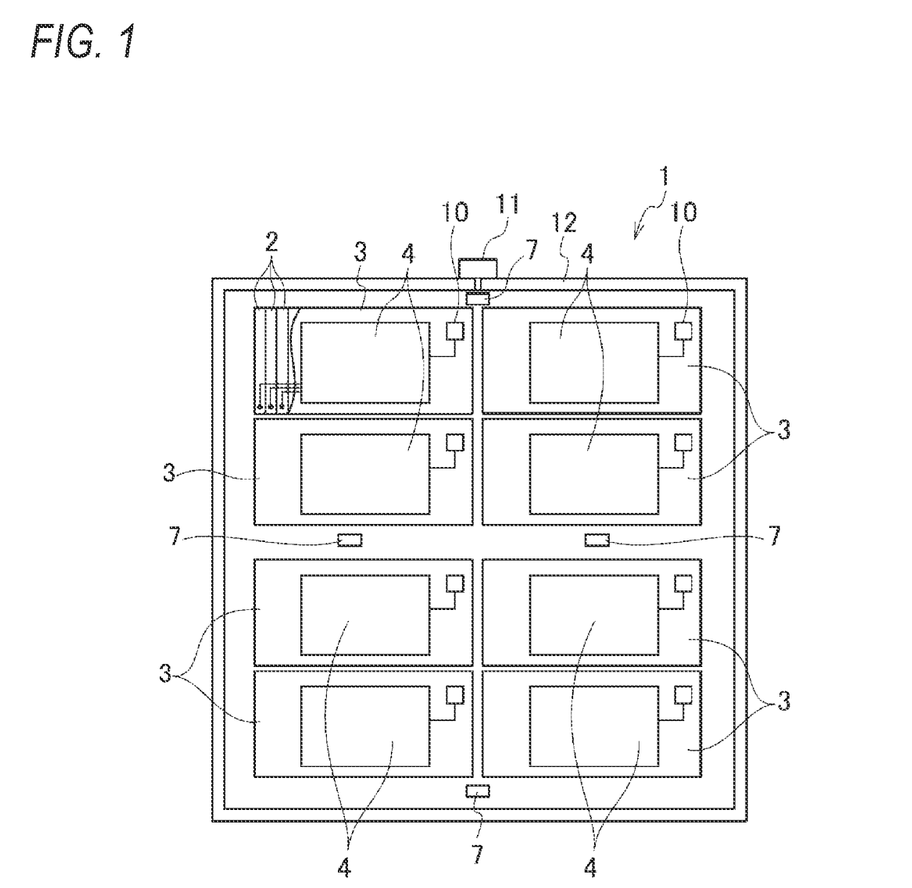
FIG. 1 is a schematic plan view of a battery pack to which an abnormality detection device according to a first embodiment of the present invention is applied.

As shown in FIG. 1, a plurality of (for example, eight) battery modules 3 each configured by stacking a plurality of battery cells 2 are accommodated inside a battery pack 1. In addition, in the battery pack 1, a voltage value sensor 4 that measures a voltage value of each battery cell 2 and a thermistor 10 that acquires a temperature of at least one battery cell 2 of the plurality of battery cells 2 are provided for each battery module 3. The voltage values of the battery cells 2 measured by the plurality of voltage value sensors 4 are input to a battery ECU 5 (see FIG. 2). The battery ECU 5 may be arranged inside the battery pack 1, or may be arranged outside the battery pack 1.

[Abnormality Detection Device]

Figure 2:
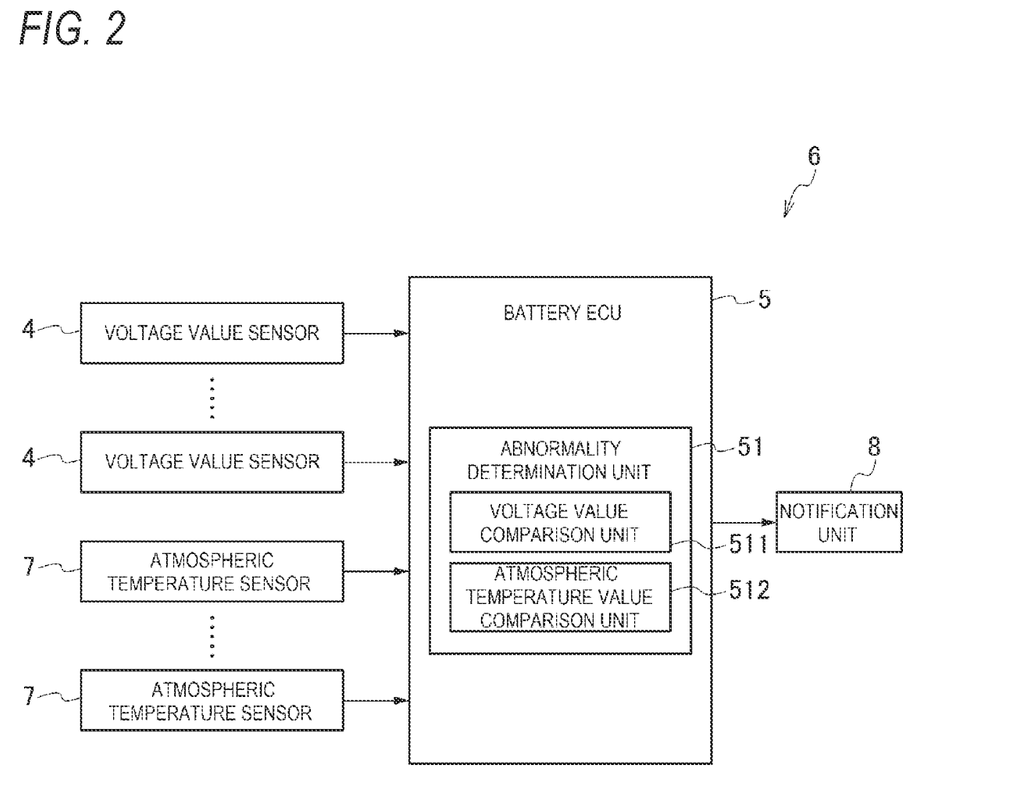
FIG. 2 is a block diagram showing a configuration of the abnormality detection device according to the first embodiment of the present invention.

As shown in FIG. 2, an abnormality detection device 6 includes the voltage value sensors 4 and the battery ECU 5 described above, atmospheric temperature sensors 7 that measure an atmospheric temperature inside the battery pack 1, and a notification unit 8 that notifies that the battery pack 1 is in an abnormal state. Each of the atmospheric temperature sensors 7 is a temperature sensor that is different from the thermistor 10 that acquires the temperature of at least one battery cell 2 of the plurality of battery cells 2. In addition, the notification unit 8 is, for example, a dedicated warning lamp provided in a meter panel or a speaker that emits sound.

[Abnormality Determination Unit]

The battery ECU 5 includes an abnormality determination unit 51 that determines an abnormality of the battery pack 1 as a functional configuration implemented by cooperation of hardware and software. The abnormality determination unit 51 includes a voltage value comparison unit 511 that compares the voltage value measured by the voltage value sensor 4 with a predetermined voltage threshold value, and an atmospheric temperature value comparison unit 512 that compares an atmospheric temperature value measured by the atmospheric temperature sensor 7 with a predetermined atmospheric temperature threshold value, and determines the abnormality of the battery pack 1 based on both a comparison result by the voltage value comparison unit 511 and a comparison result by the atmospheric temperature value comparison unit 512.

According to the abnormality determination unit 5, since the abnormality of the battery pack 1 is determined based on both the comparison result by the voltage value comparison unit 511 and the comparison result by the atmospheric temperature value comparison unit 512, thermal runaway of the battery cell 2 can be accurately detected in distinction from a failure of the voltage value sensor 4 that is not caused by the thermal runaway. In addition, the atmospheric temperature sensor 7 only needs to be able to measure an atmospheric temperature inside the battery pack 1, and is not required to be provided for all the battery cells 2, and therefore it is possible to suppress an increase in manufacturing cost.

In a case where the voltage value is equal to or less than the predetermined voltage threshold value and the atmospheric temperature value is equal to or greater than the predetermined atmospheric temperature threshold value, the abnormality determination unit 51 of the present embodiment determines that an abnormality has occurred in the battery pack 1. In this way, the thermal runaway of the battery cell 2 can be more accurately detected. In the present embodiment, a condition that the atmospheric temperature value is equal to or greater than the predetermined atmospheric temperature threshold value is set as a condition for establishing the abnormality determination, but a condition that a degree of change in the atmospheric temperature value per unit time is equal to or greater than a predetermined threshold value may be set as the condition for establishing the abnormality determination, and both the condition that the atmospheric temperature value is equal to or greater than the predetermined atmospheric temperature threshold value and the condition that the degree of change in the atmospheric temperature value per unit time is equal to or greater than the predetermined threshold value may be set as the condition for establishing the abnormality determination.

The battery pack 1 is provided with a gas safety valve 11 in a wall portion 12 surrounding the plurality of battery modules 3. The gas safety valve 11 opens when an internal pressure of the battery pack 1 becomes higher than a predetermined value due to high-temperature gas ejected from a cell safety valve of the battery cell 2 due to the thermal runaway or the like. By providing the gas safety valve 11, the internal pressure of the battery pack 1 is prevented from becoming higher than the predetermined value. Note that the wall portion 12 on which the gas safety valve 11 is provided may be any one of a front surface, a rear surface, a left surface, and a right surface of the battery pack 1.

[Arrangement of Atmospheric Temperature Sensor]

As shown in FIG. 1, a plurality of (for example, four) atmospheric temperature sensors 7 are arranged at positions separated from each other inside the battery pack 1. In this way, the thermal runaway of the battery cell 2 can be appropriately detected regardless of which battery cell 2 has the thermal runaway.

Specifically, the atmospheric temperature sensors 7 are positioned such that each battery cell 2 is within a predetermined distance (for example, 500 mm) from any one of the atmospheric temperature sensors 7. In this way, the thermal runaway of the battery cell 2 can be appropriately detected regardless of which battery cell 2 has the thermal runaway.

It is preferable that at least three atmospheric temperature sensors 7 are arranged spaced apart from each other inside the battery pack 1. In the present embodiment, four atmospheric temperature sensors 7 are arranged spaced apart from each other inside the battery pack 1. In such an arrangement configuration of the atmospheric temperature sensor 7, the abnormality determination unit 51 may determine that an abnormality has occurred in the battery pack 1 in the case where the voltage value is equal to or less than the predetermined voltage threshold value and a difference between an atmospheric temperature value of one atmospheric temperature sensor 7 and an atmospheric temperature value of the remaining one of the atmospheric temperature sensors 7 (two in the case of three, the other three in the case of four) is equal to or greater than a predetermined threshold value. In this way, even when one atmospheric temperature sensor 7 fails due to the thermal runaway, the thermal runaway of the battery cell 2 can be accurately detected.

It is preferable that the one atmospheric temperature sensor 7 of the plurality of atmospheric temperature sensors 7 is arranged in a vicinity of the gas safety valve 11. In the present embodiment, one atmospheric temperature sensor 7 is provided across the wall portion 12 from the gas safety valve 11 (on an inner surface side of the wall portion 12). As described above, the atmospheric temperature sensor 7 is arranged on a gas discharge path, the thermal runaway of the battery cell 2 can be appropriately detected regardless of which battery cell 2 has the thermal runaway.

[Basic Operation of Abnormality Detection Device]

Figure 3:
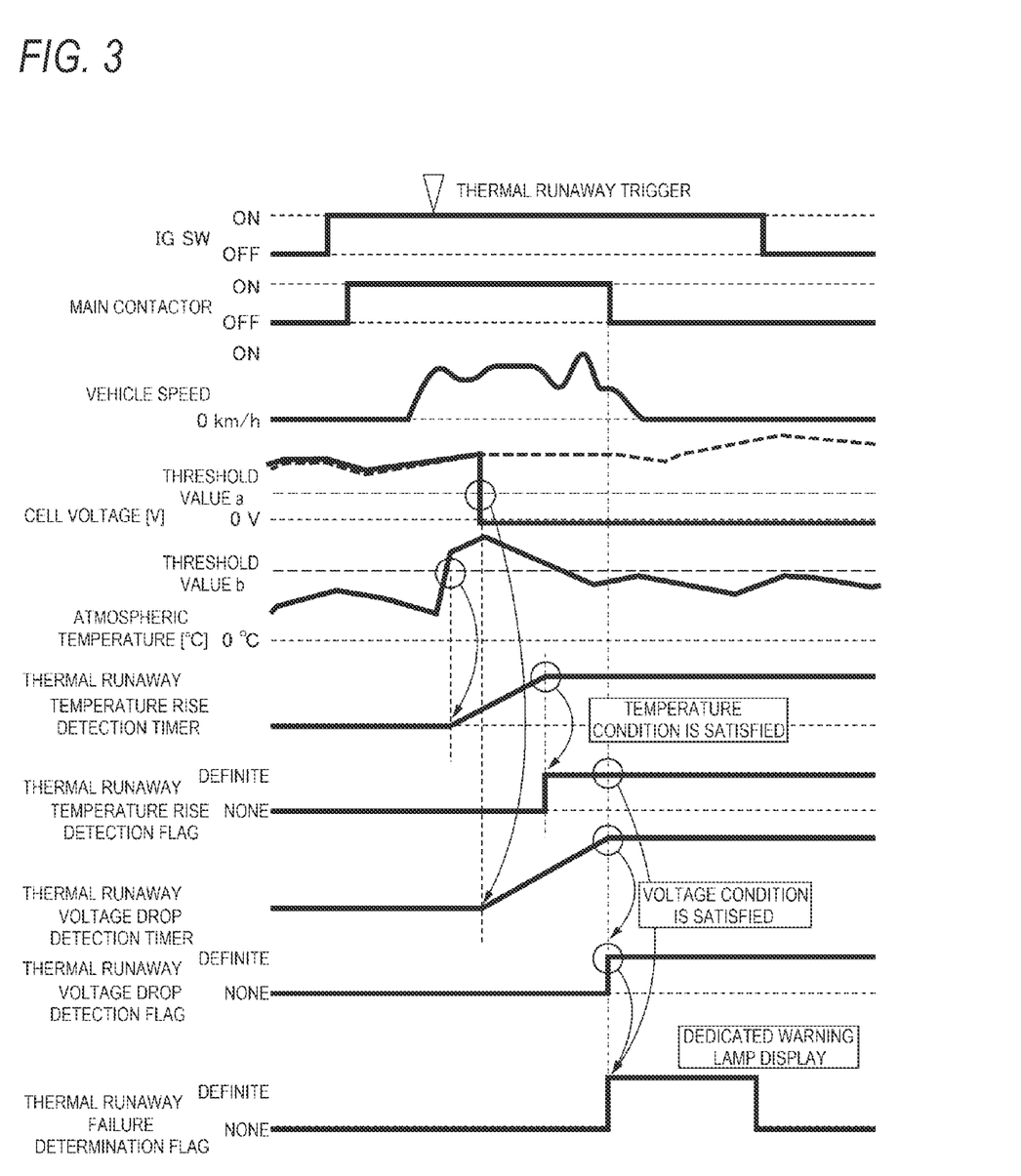
FIG. 3 is a timing chart showing a basic operation of the abnormality detection device of FIG. 2.

As shown in FIG. 3, in a case where a measured voltage value of any one of the voltage value sensors 4 is equal to or less than a predetermined voltage threshold value a, the abnormality determination unit 51 starts a thermal runaway voltage drop detection timer for a predetermined time, and when a state in which the measured voltage value of any one of the voltage value sensors 4 is equal to or less than the predetermined voltage threshold value a continues for a predetermined time, the abnormality determination unit 51 determines that a voltage condition is satisfied, and sets a definite value in a thermal runaway voltage drop detection flag.

In a case where a measured atmospheric temperature value of any one of the atmospheric temperature sensors 7 is equal to or greater than a predetermined atmospheric temperature threshold value b, the abnormality determination unit 51 starts a thermal runaway temperature rise detection timer for a predetermined time, and when a state in which the measured atmospheric temperature value of any one of the atmospheric temperature sensors 7 is equal to or greater than the predetermined atmospheric temperature threshold value b continues for the predetermined time, the abnormality determination unit 51 determines that a temperature condition is satisfied, and sets a definite value in a thermal runaway temperature rise detection flag.

When the definite value is set to both the thermal runaway voltage drop detection flag and the thermal runaway temperature rise detection flag, the abnormality determination unit 51 determines that the thermal runaway has occurred in any one of the battery cells 2, sets a definite value in a thermal runaway failure determination flag, and operates the notification unit 8 to notify a user of the abnormality of the battery pack 1.

[Processing Procedure of Abnormality Detection Device (Abnormality Detection Method)]

Next, a processing procedure of the abnormality detection device 6 that implements the basic operation as described above will be described with reference to FIG. 4.

Figure 4:
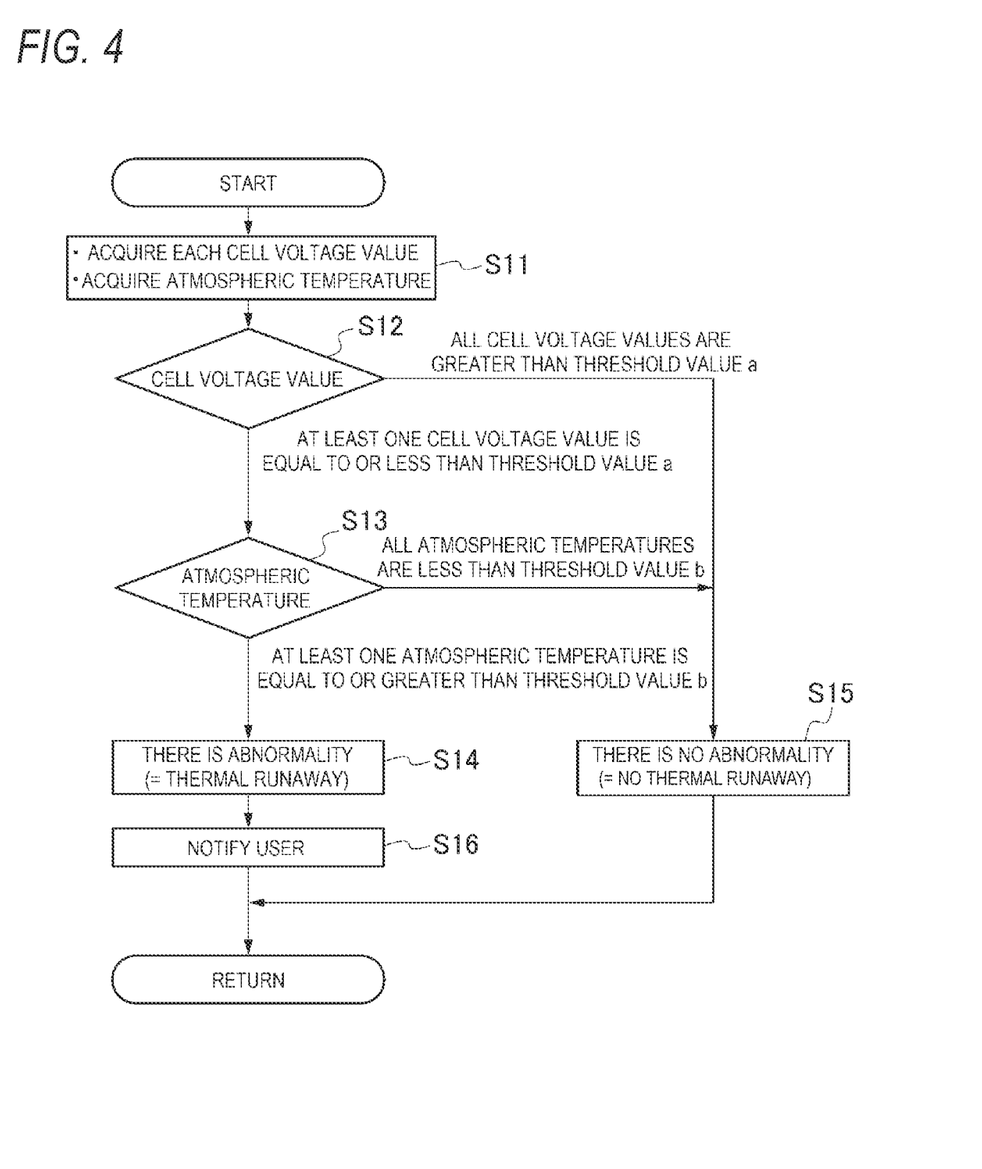
FIG. 4 is a flowchart showing a processing procedure of the abnormality detection device of FIG. 2.

As shown in FIG. 4, the abnormality determination unit 51 acquires the voltage value of each battery cell 2 from each voltage value sensor 4, and acquires the atmospheric temperature value in the battery pack 1 from each atmospheric temperature sensor 7 (step S11).

Next, the abnormality determination unit 51 compares the acquired voltage value (cell voltage value) with the voltage threshold value a (step S12). Specifically, the abnormality determination unit 51 determines whether the voltage values of all the battery cells 2 are greater than the voltage threshold value a or the voltage value of at least one battery cell 2 is equal to or less than the voltage threshold value a.

In a case where it is determined that the voltage values of all the battery cells 2 are greater than the voltage threshold value a, the abnormality determination unit 51 determines that there is no abnormality (thermal runaway) (step S15), and in a case where it is determined that the voltage value of the at least one battery cell 2 is equal to or less than the voltage threshold value a, the abnormality determination unit 51 proceeds to step S13.

In step S13, the abnormality determination unit 51 compares the acquired atmospheric temperature value with the atmospheric temperature threshold value b. Specifically, the abnormality determination unit 51 determines whether all the atmospheric temperature values are less than the atmospheric temperature threshold value b or at least one atmospheric temperature value is equal to or greater than the atmospheric temperature threshold value b.

In the case where it is determined that all the atmospheric temperature values are less than the atmospheric temperature threshold value b, the abnormality determination unit 51 determines that there is no abnormality (thermal runaway) (step S15), and in the case where it is determined that the at least one atmospheric temperature value is equal to or greater than the atmospheric temperature threshold value b, the abnormality determination unit 51 determines that there is an abnormality (thermal runaway) (step S14). In a case where it is determined that there is an abnormality, the abnormality determination unit 51 operates the notification unit 8 to notify the user of the abnormality (step S16).

Figure 5:
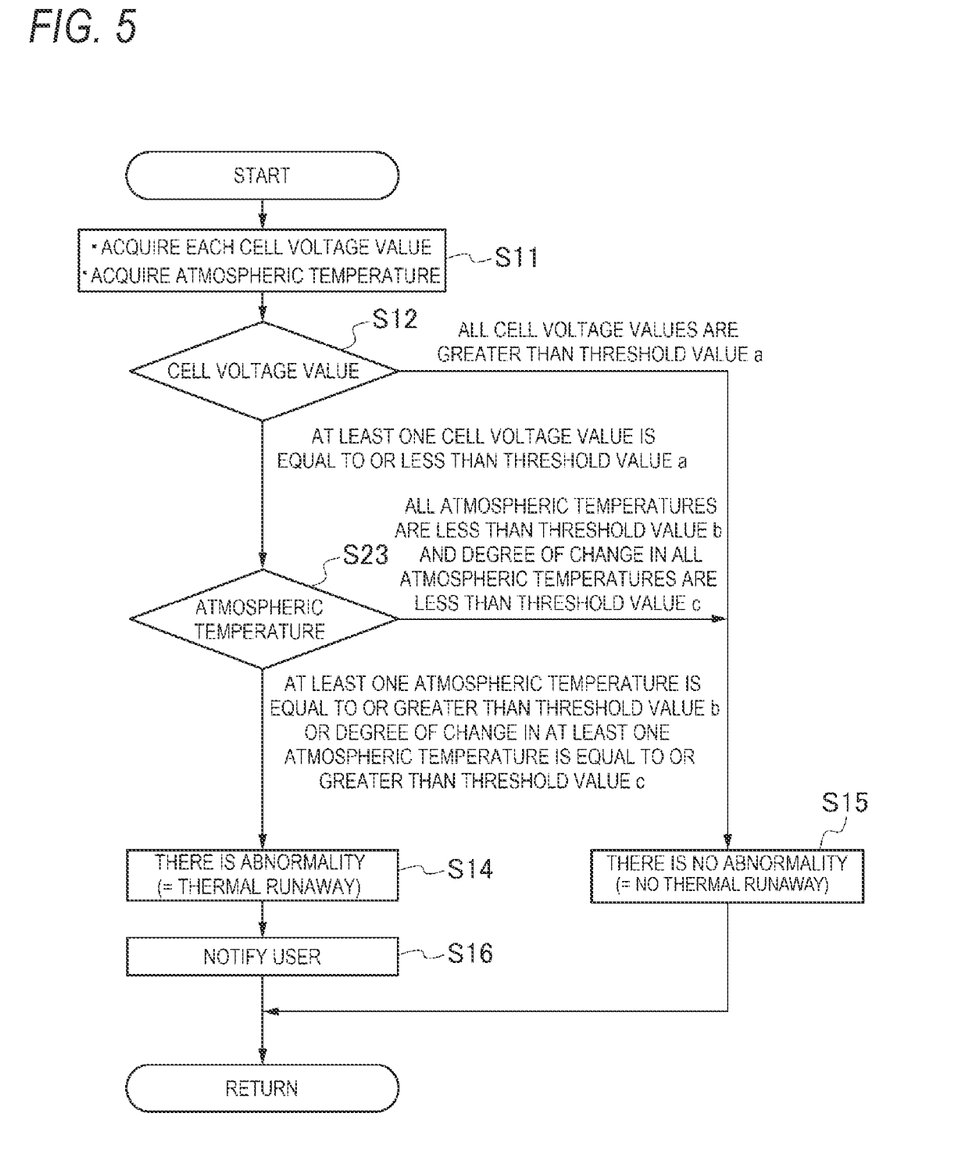
FIG. 5 is a flowchart showing a processing procedure according to a modification of the abnormality detection device of FIG. 2.

As shown in a modification of FIG. 5, in step S23, instead of step S13, the abnormality determination unit 51 may compare the acquired atmospheric temperature value with the atmospheric temperature threshold value b, and may compare the acquired degree of change in the atmospheric temperature value per unit time with a degree of change threshold value c. Specifically, the abnormality determination unit 51 determines whether all the atmospheric temperature values are less than the atmospheric temperature threshold value b and the degree of change in all the atmospheric temperature values per unit time is less than the degree of change threshold value c, or whether the at least one atmospheric temperature value is equal to or greater than the atmospheric temperature threshold value b or the degree of change in the at least one atmospheric temperature value per unit time is equal to or greater than the degree of change threshold value c.

In this case, in the case where it is determined that all the atmospheric temperature values are less than the atmospheric temperature threshold value b and the degree of change in all the atmospheric temperature values per unit time is less than the degree of change threshold value c, the abnormality determination unit 51 determines that there is no abnormality (thermal runaway) (step S15), and in the case where it is determined that the at least one atmospheric temperature value is equal to or greater than the atmospheric temperature threshold value b or the degree of change in the at least one atmospheric temperature value per unit time is equal to or greater than the degree of change threshold value c, the abnormality determination unit 51 determines that there is an abnormality (thermal runaway) (step S14).

Second Embodiment

Next, an abnormality detection device 6 according to a second embodiment of the present invention will be described with reference to FIGS. 6 and 7. Note that the same configurations and processing steps as those in the first embodiment are denoted by the same reference numerals as those in the first embodiment, and the description of the first embodiment may be incorporated herein.

The abnormality determination unit 51 according to the second embodiment is different from the first embodiment in that, in a case where the voltage value cannot be acquired from any one of the voltage value sensors 4, the abnormality determination unit 51 determines whether the atmospheric temperature value acquired from the atmospheric temperature sensor 7 is equal to or greater than the atmospheric temperature threshold value b, and in the case where the atmospheric temperature value is equal to or greater than the atmospheric temperature threshold value b, the abnormality determination unit 51 determines that there is an abnormality. According to the second embodiment, the thermal runaway of the battery cell 2 can be accurately detected even when the voltage value sensor 4 fails due to the thermal runaway.

[Basic Operation of Abnormality Detection Device According to Second Embodiment]

Figure 6:
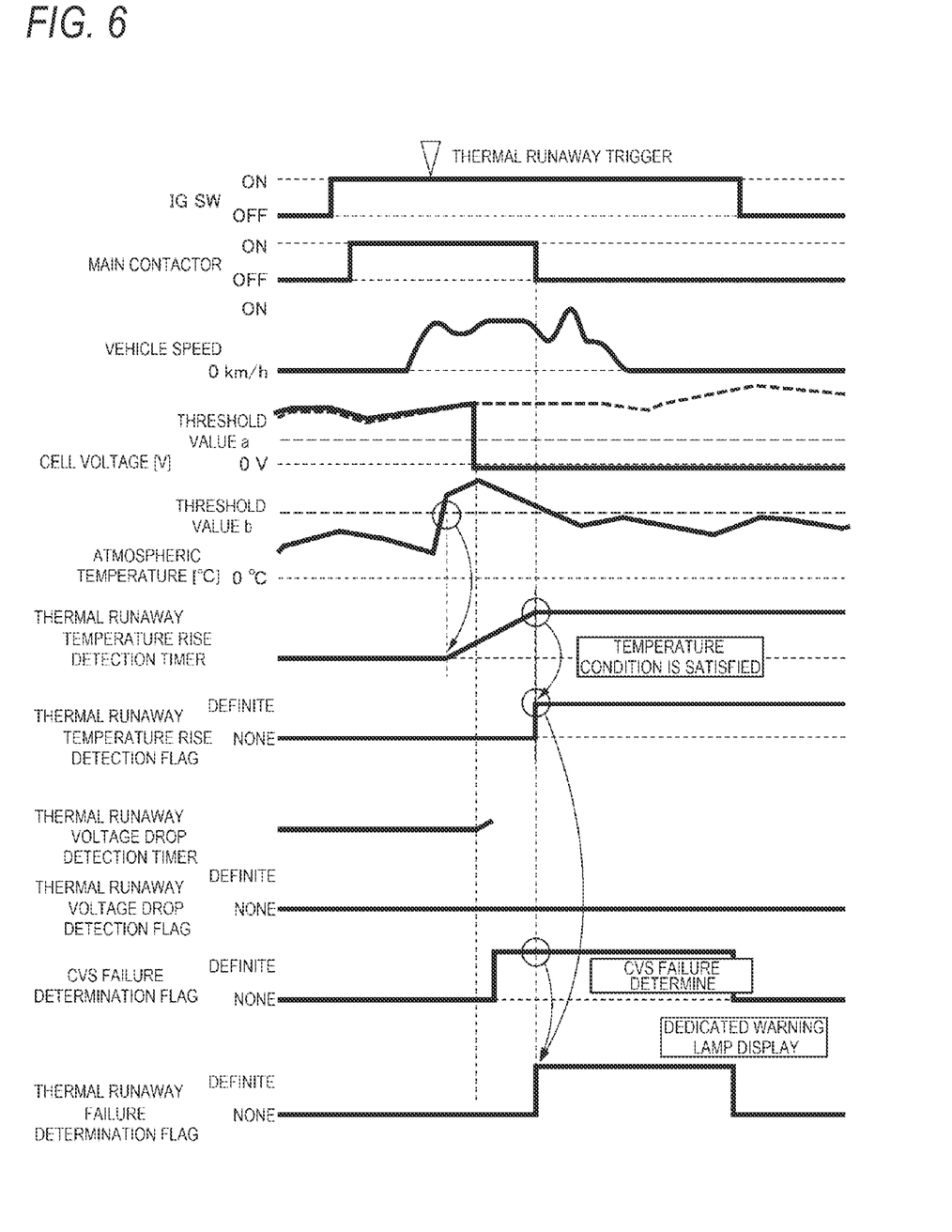
FIG. 6 is a timing chart showing a basic operation of an abnormality detection device according to a second embodiment of the present invention.

As shown in FIG. 6, in the case where the voltage value of any one of the voltage value sensors 4 cannot be acquired, the abnormality determination unit 51 determines that the voltage value sensor 4 (CVS) has failed, and sets a definite value in a CVS failure determination flag.

In the case where the measured atmospheric temperature value of any one of the atmospheric temperature sensors 7 is equal to or greater than the predetermined atmospheric temperature threshold value b, the abnormality determination unit 51 starts the thermal runaway temperature rise detection timer for a predetermined time, and when the state in which the measured atmospheric temperature value of any one of the atmospheric temperature sensors 7 is equal to or greater than the predetermined atmospheric temperature threshold value b continues for the predetermined time, the abnormality determination unit 51 determines that the temperature condition is satisfied, and sets a definite value in the thermal runaway temperature rise detection flag.

When the definite value is set to both the CVS failure determination flag and the thermal runaway temperature rise detection flag, the abnormality determination unit 51 determines that the thermal runaway has occurred in any one of the battery cells 2, sets the definite value in the thermal runaway failure determination flag, and operates the notification unit 8 to notify the user of the abnormality of the battery pack 1.

[Processing Procedure (Abnormality Detection Method) of Abnormality Detection Device According to Second Embodiment]

Next, a processing procedure of the abnormality detection device 6 according to the second embodiment that implements the basic operation as described above will be described with reference to FIG. 7.

Figure 7:
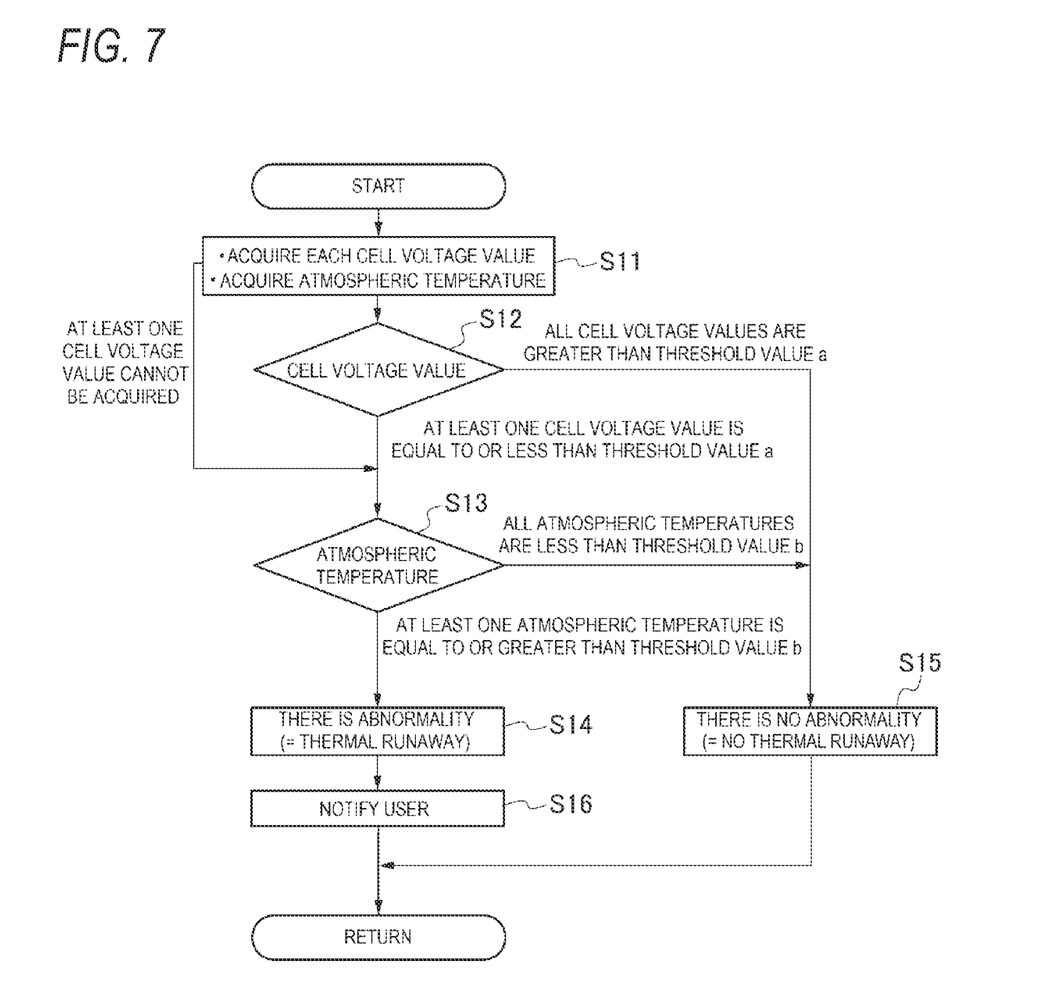
FIG. 7 is a flowchart showing a processing procedure of the abnormality detection device according to the second embodiment of the present invention.

As shown in FIG. 7, the abnormality determination unit 51 acquires the voltage value of each battery cell 2 from each voltage value sensor 4, and acquires the atmospheric temperature value in the battery pack 1 from each atmospheric temperature sensor 7 (step S11). In a case where the voltage values from all the voltage value sensors 4 are acquired, the abnormality determination unit 51 proceeds to step S12, but in the case where the voltage value from at least one voltage value sensor 4 cannot be acquired, the abnormality determination unit 51 skips step S12 and proceeds to step S13.

In step S12, the abnormality determination unit 51 compares the acquired voltage value with the voltage threshold value a. Specifically, the abnormality determination unit 51 determines whether the voltage values of all the battery cells 2 are greater than the voltage threshold value a or the voltage value of the at least one battery cell 2 is equal to or less than the voltage threshold value a.

In a case where it is determined that the voltage values of all the battery cells 2 are greater than the voltage threshold value a, the abnormality determination unit 51 determines that there is no abnormality (thermal runaway) (step S15), and in a case where it is determined that the voltage value of the at least one battery cell 2 is equal to or less than the voltage threshold value a, the abnormality determination unit 51 proceeds to step S13.

In step S13, the abnormality determination unit 51 compares the acquired atmospheric temperature value with the atmospheric temperature threshold value b. Specifically, the abnormality determination unit 51 determines whether all the atmospheric temperature values are less than the atmospheric temperature threshold value b or the at least one atmospheric temperature value is equal to or greater than the atmospheric temperature threshold value b.

In the case where it is determined that all the atmospheric temperature values are less than the atmospheric temperature threshold value b, the abnormality determination unit 51 determines that there is no abnormality (thermal runaway) (step S15), and in the case where it is determined that the at least one atmospheric temperature value is equal to or greater than the atmospheric temperature threshold value b, the abnormality determination unit 51 determines that there is an abnormality (thermal runaway) (step S14). In the case where it is determined that there is an abnormality, the abnormality determination unit 51 operates the notification unit 8 to notify the user of the abnormality (step S16). Also in the second embodiment, step S23 can be adopted instead of step S13.

Third Embodiment

Next, the abnormality detection device 6 according to a third embodiment of the present invention will be described with reference to FIG. 8. However, the same configurations as those in the first embodiment are denoted by the same reference numerals as those in the first embodiment, and the description of the first embodiment may be incorporated herein.

The abnormality detection device 6 according to the third embodiment is different from the first embodiment in that an abnormality is detected using a pressure sensor 9 that measures a pressure value inside the battery pack 1, instead of the atmospheric temperature sensor 7. Each battery cell 2 is provided with a pressure release valve, and when the thermal runaway occurs and an internal pressure of the battery cell 2 becomes higher than a predetermined pressure, the pressure release valve opens, a pressure in the battery cell 2 is released, and the pressure value inside the battery pack 1 increases. According to the third embodiment, the thermal runaway of the battery cell 2 can be accurately detected by measuring an increase in the pressure inside the battery pack 1 due to the thermal runaway of the battery cell 2. It is preferable that a plurality of the pressure sensors 9 are arranged at positions separated from each other inside the battery pack 1.

Figure 8:
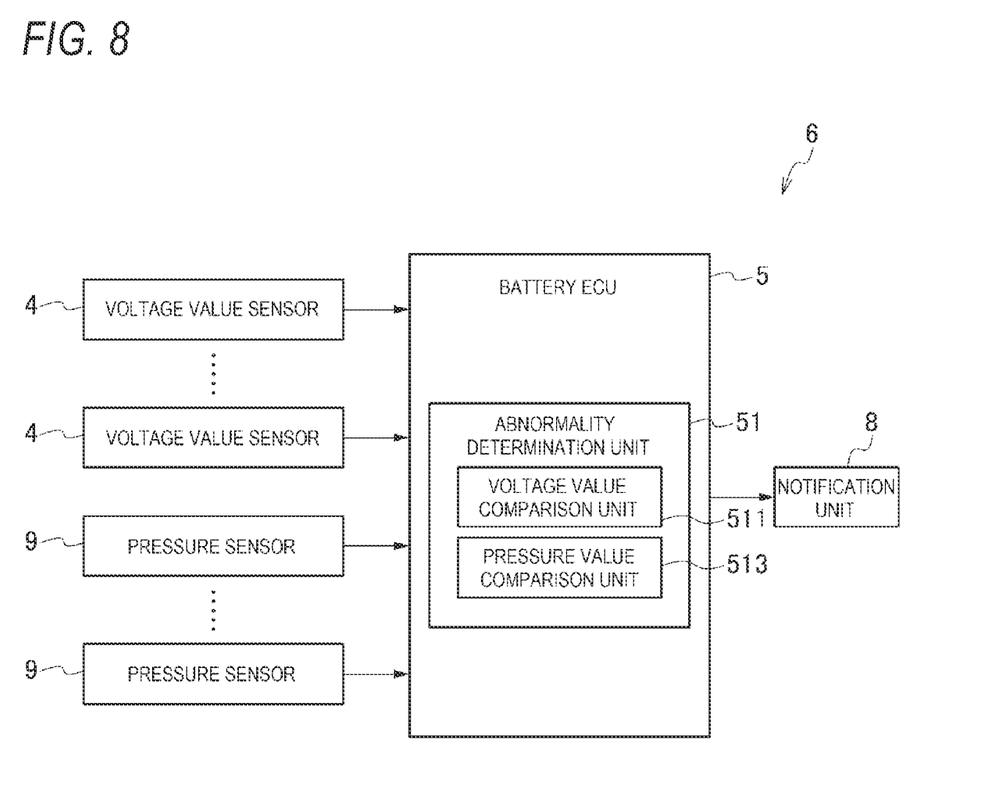
FIG. 8 is a block diagram showing a configuration of an abnormality detection device according to a third embodiment of the present invention.

As shown in FIG. 8, the abnormality detection device 6 according to the third embodiment includes a pressure value comparison unit 513 instead of the atmospheric temperature value comparison unit 512. The pressure value comparison unit 513 compares the pressure value acquired by the pressure sensor 9 or a degree of change in the pressure value per unit time with a predetermined threshold value.

Note that the embodiments described above can be appropriately modified, improved, and the like.

At least the following matters are described in the present specification. Although corresponding constituent elements or the like in the embodiments described above are shown in parentheses, the present invention is not limited thereto.

(1) An abnormality detection device (abnormality detection device 6) for a battery pack that detects an abnormality of a battery pack (battery pack 1) accommodating a plurality of battery cells (battery cells 2), the abnormality detection device including:

a voltage value acquisition unit (voltage value sensor 4) configured to acquire a voltage value of each of the plurality of battery cells;

at least one state value measurement unit (atmospheric temperature sensor 7, pressure sensor 9) configured to measure a state value inside the battery pack, the state value being different from a temperature of at least one battery cell among the plurality of battery cells, and an abnormality determination unit (abnormality determination unit 51) configured to determine an abnormality of the battery pack, in which the abnormality determination unit includes:

a voltage value comparison unit (voltage value comparison unit 511) configured to compare the voltage value acquired by the voltage value acquisition unit with a predetermined voltage threshold value (voltage threshold value a), and a state value comparison unit (atmospheric temperature value comparison unit 512, pressure value comparison unit 513) configured to compare at least one of the state value acquired by the at least one state value measurement unit and a degree of change in the state value per unit time with a predetermined state threshold value (atmospheric temperature threshold value b), and in which the abnormality determination unit is configured to determine an abnormality of the battery pack based on both a comparison result by the voltage value comparison unit and a comparison result by the state value comparison unit.

According to (1), the abnormality determination unit determines the abnormality of the battery pack based on both the comparison result by the voltage value comparison unit and the comparison result by the state value comparison unit, so that thermal runaway of the battery cell can be accurately detected in distinction from a failure of the voltage value acquisition unit that is not caused by the thermal runaway. In addition, the state value measurement unit only needs to be able to measure the state value inside the battery pack, and is not required to be provided for all the battery cells, and therefore it is possible to suppress an increase in manufacturing cost.

(2) The abnormality detection device for a battery pack according to (1), in which the abnormality determination unit is configured to, when the voltage value is equal to or less than the predetermined voltage threshold value and at least one of the state value and the degree of change in the state value is equal to or greater than the predetermined state threshold value, determine that an abnormality has occurred in the battery pack.

According to (2), in the case where the voltage value is equal to or less than the predetermined voltage threshold value and at least one of the state value and the degree of change in the state value is equal to or greater than the predetermined state threshold value, the abnormality determination unit determines that an abnormality has occurred in the battery pack, so that the thermal runaway of the battery cell can be more accurately detected.

(3) The abnormality detection device for a battery pack according to (1) or (2), in which the abnormality determination unit is configured to, when the voltage value is unable to be acquired by the voltage value acquisition unit and at least one of the state value and the degree of change in the state value is equal to or greater than the predetermined state threshold value, determine that an abnormality has occurred in the battery pack.

According to (3), in the case where the voltage value is unable to be acquired by the voltage value acquisition unit and at least one of the state value and the degree of change is equal to or greater than the predetermined state threshold value, the abnormality determination unit determines that an abnormality has occurred in the battery pack, so that the thermal runaway of the battery cell can be accurately detected even when the voltage value acquisition unit fails due to the thermal runaway.

(4) The abnormality detection device for a battery pack according to any one of (1) to (3), in which the state value is an atmospheric temperature inside the battery pack.

According to (4), the thermal runaway of the battery cell can be accurately detected by measuring an increase in the temperature inside the battery pack due to the thermal runaway of the battery cell.

(5) The abnormality detection device for a battery pack according to any one of (1) to (3), in which the state value is a pressure value inside the battery pack.

According to (5), the thermal runaway of the battery cell can be accurately detected by measuring an increase in the pressure inside the battery pack due to the thermal runaway of the battery cell.

(6) The abnormality detection device for a battery pack according to (4) or (5), in which the at least one state value measurement unit includes state value measurement units, and in which the state value measurement units are arranged spaced apart from each other inside the battery pack.

According to (6), the state value measurement units are arranged spaced apart from each other inside the battery pack, so that the thermal runaway of the battery cell can be appropriately detected regardless of which battery cell has the thermal runaway.

(7) The abnormality detection device for a battery pack according to (6), in which the state value measurement units are positioned such that each of the plurality of battery cells is within a predetermined distance from any one of the state value measurement units.

According to (7), the state value measurement units are positioned such that each of the plurality of battery cells is within the predetermined distance from any one of the state value measurement units, so that the thermal runaway of the battery cell can be more appropriately detected regardless of which battery cell has the thermal runaway.

(8) The abnormality detection device for a battery pack according to any one of (1) to (7), in which the at least one state value measurement unit includes at least three state value measurement units arranged spaced apart from each other inside the battery pack, and in which the abnormality determination unit is configured to, when the voltage value is equal to or less than the predetermined voltage threshold value and differences between one state value measured by one of the at least three state value measurement units and other two state values measured by others of the at least three state value measurement units are equal to or greater than a predetermined threshold value, determine that an abnormality has occurred in the battery pack.

According to (8), when the voltage value is equal to or less than the predetermined voltage threshold value and the differences between the one state value and the other two state values are equal to or greater than the predetermined threshold value, the abnormality determination unit determines that an abnormality has occurred in the battery pack, so that the thermal runaway of the battery cell can be accurately detected even when one state value measurement unit fails due to the thermal runaway.

(9) The abnormality detection device for a battery pack according to any one of (1) to (8), further including:
- a notification unit (notification unit 8) configured to, when the abnormality determination unit determines that an abnormality has occurred in the battery pack, notify that the battery pack is in an abnormal state.

According to (9), it is possible to notify a user of the abnormality of the battery pack by the notification unit.

(10) The abnormality detection device for a battery pack according to any one of (1) to (9),
- in which the battery pack includes a gas safety valve (gas safety valve 11), in a wall portion (wall portion 12), configured to open when an internal pressure of the battery pack is higher than a predetermined value, and
- in which the state value measurement unit is provided across the wall portion from the gas safety valve.

According to (10), since the atmospheric temperature sensor is arranged on a gas discharge path, the thermal runaway of the battery cell can be appropriately detected regardless of which battery cell has the thermal runaway.

(11) An abnormality detection method for a battery pack that detects an abnormality of a battery pack (battery pack 1) accommodating a plurality of battery cells (battery cells 2), the abnormality detection method including:
- a first acquisition step (step S11) of acquiring a voltage value of each of the plurality of battery cells by a voltage value acquisition unit (voltage value sensor 4);
- a second acquisition step (step S11) of acquiring a state value inside the battery pack by a state value measurement unit (atmospheric temperature sensor 7, pressure sensor 9) configured to measure a state value inside the battery pack, the state value being different from a temperature of at least one battery cell among the plurality of battery cells;
- a first comparison step (step S12) of comparing the voltage value with a voltage threshold value (voltage threshold value a);
- a second comparison step (step S13) of comparing at least one of the state value and a degree of change in the state value per unit time with a predetermined state threshold value (atmospheric temperature threshold value b); and
- a determination step (steps S14 and S15) of determining an abnormality of the battery pack based on both a comparison result in the first comparison step and a comparison result in the second comparison step.

According to (11), since the abnormality of the battery pack is determined in the determination step based on both the comparison result in the first comparison step based on the voltage value and the comparison result in the second comparison step based on the state value and the like, the thermal runaway of the battery cell can be accurately detected in distinction from the failure of the voltage value acquisition unit that is not caused by the thermal runaway. In addition, the state value measurement unit only needs to be able to measure the state value inside the battery pack, and is not required to be provided for all the battery cells, and therefore it is possible to suppress the increase in the manufacturing cost.

(12) The abnormality detection method for a battery pack according to (11),
- in which the determination step includes determining the abnormality of the battery pack based on the comparison result in the second comparison step when the voltage value is unable to be acquired in the first acquisition step.

According to (12), when the voltage value is unable to be acquired by the voltage value acquisition unit, the abnormality of the battery pack is determined based on the comparison result in the second comparison step, so that the thermal runaway of the battery cell can be accurately detected even when the voltage value acquisition unit fails due to the thermal runaway.

(13) The abnormality detection method for a battery pack according to (11) or (12), further including:
- a notification step (step S16) of notifying that the battery pack is in an abnormal state when it is determined in the determination step that an abnormality has occurred in the battery pack.

According to (13), it is possible to notify the user of the abnormality of the battery pack.

What is claimed is:

1. An abnormality detection device for a battery pack that detects an abnormality of a battery pack accommodating a plurality of battery cells, the abnormality detection device comprising:
   - a voltage value acquisition unit configured to acquire a voltage value of each of the plurality of battery cells;
   - at least one state value measurement unit configured to measure a state value inside the battery pack, the state value being different from a temperature of at least one battery cell among the plurality of battery cells; and
   - an abnormality determination unit configured to determine an abnormality of the battery pack,
   - wherein the abnormality determination unit includes:
     - a voltage value comparison unit configured to compare the voltage value acquired by the voltage value acquisition unit with a predetermined voltage threshold value, and
     - a state value comparison unit configured to compare the state value acquired by the at least one state value measurement unit with a first predetermine state threshold value and to compare a degree of change in the state value per unit time with a second predetermined state threshold value,
   - wherein the abnormality determination unit is configured to determine an abnormality of the battery pack when the voltage value is equal to or less than the predetermined voltage threshold value and the state value is equal to or greater than the first predetermine state threshold value, or the voltage value is equal to or less than the predetermined voltage threshold value and the degree of change in the state value is equal to or greater than the second predetermined state threshold value, and
   - wherein the voltage value acquisition unit, the at least one state value measurement unit, the abnormality determination unit, the voltage value comparison unit, and the state value comparison unit are each implemented via at least one processor.

2. The abnormality detection device for a battery pack according to claim 1,
   - wherein, in a situation where the voltage value is unable to be acquired by the voltage value acquisition unit, the abnormality determination unit is further configured to, when the state value is equal to or greater than the first predetermined state threshold value or the degree of change in the state value is equal to or greater than the second predetermined state threshold value, determine that an abnormality has occurred in the battery pack.

3. The abnormality detection device for a battery pack according to claim 1,
wherein the state value is an atmospheric temperature inside the battery pack.

4. The abnormality detection device for a battery pack according to claim 1,
wherein the state value is a pressure value inside the battery pack.

5. The abnormality detection device for a battery pack according to claim 3,
wherein the at least one state value measurement unit includes state value measurement units, and
wherein the state value measurement units are arranged spaced apart from each other inside the battery pack, and
wherein the state value measurement units are each implemented via at least one processor.

6. The abnormality detection device for a battery pack according to claim 5,
wherein the state value measurement units are positioned such that each of the plurality of battery cells is within a predetermined distance from any one of the state value measurement units.

7. The abnormality detection device for a battery pack according to claim 1,
wherein the at least one state value measurement unit includes at least three state value measurement units arranged spaced apart from each other inside the battery pack, and
wherein the abnormality determination unit is further configured to, when the voltage value is equal to or less than the predetermined voltage threshold value and differences between one state value measured by one of the at least three state value measurement units and other two state values measured by others of the at least three state value measurement units are equal to or greater than a predetermined threshold value, determine that an abnormality has occurred in the battery pack.

8. The abnormality detection device for a battery pack according to claim 1, further comprising:
a notification unit configured to, when the abnormality determination unit determines that an abnormality has occurred in the battery pack, notify that the battery pack is in an abnormal state,
wherein the notification unit is implemented via at least one processor.

9. The abnormality detection device for a battery pack according to claim 1,
wherein the battery pack includes a gas safety valve, in a wall portion, configured to open when an internal pressure of the battery pack is higher than a predetermined value, and
wherein the state value measurement unit is provided across the wall portion from the gas safety valve.

10. An abnormality detection method for a battery pack that detects an abnormality of a battery pack accommodating a plurality of battery cells, the abnormality detection method comprising:
acquiring a voltage value of each of the plurality of battery cells by a voltage value acquisition unit;
acquiring a state value inside the battery pack by a state value measurement unit configured to measure a state value inside the battery pack, the state value being different from a temperature of at least one battery cell among the plurality of battery cells;
performing a voltage value comparison comparing the voltage value with a predetermined voltage threshold value;
performing a state value comparison comparing the state value with a first predetermined state threshold value and comparing a degree of change in the state value per unit time with a second predetermined state threshold value; and
determining an abnormality of the battery pack when the voltage value is equal to or less than the predetermined voltage threshold value and the state value is equal to or greater than the first predetermine state threshold value, or the voltage value is equal to or less than the predetermined voltage threshold value and the degree of change in the state value is equal to or greater than the second predetermined state threshold value.

11. The abnormality detection method for a battery pack according to claim 10,
wherein, in a situation where the voltage value is unable to be acquired in acquiring the voltage value, determining the abnormality of the battery pack includes determining the abnormality of the battery pack when the state value is equal to or greater than the first predetermined state threshold value or the degree of change in the state value is equal to or greater than the second predetermined state threshold value.

12. The abnormality detection method for a battery pack according to claim 10 further comprising:
notifying that the battery pack is in an abnormal state when it is determined in determining the abnormality of the battery pack that an abnormality has occurred in the battery pack.

* * * * *